US008571792B2

(12) United States Patent
Goto et al.

(10) Patent No.: US 8,571,792 B2
(45) Date of Patent: Oct. 29, 2013

(54) NAVIGATION DEVICE AND DISPLAY METHOD

(75) Inventors: Souju Goto, Yokohama (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1038 days.

(21) Appl. No.: 12/597,575

(22) PCT Filed: Apr. 25, 2008

(86) PCT No.: PCT/JP2008/058054
§ 371 (c)(1),
(2), (4) Date: Oct. 26, 2009

(87) PCT Pub. No.: WO2008/139890
PCT Pub. Date: Nov. 20, 2008

(65) Prior Publication Data
US 2010/0138144 A1 Jun. 3, 2010

(30) Foreign Application Priority Data
Apr. 27, 2007 (JP) .................................. 2007-119236

(51) Int. Cl.
*G01C 21/32* (2006.01)
(52) U.S. Cl.
USPC ........... 701/451; 701/438; 701/450; 701/516; 340/995.12; 340/995.24
(58) Field of Classification Search
USPC ............. 701/438, 450, 451, 516; 340/995.12, 340/995.24
See application file for complete search history.

(56) References Cited

U.S. PATENT DOCUMENTS

| 6,405,129 | B1 * | 6/2002 | Yokota | 701/438 |
|---|---|---|---|---|
| 6,845,319 | B2 * | 1/2005 | Uchida | 701/532 |
| 6,952,644 | B2 * | 10/2005 | Nakagawa | 701/438 |
| 6,983,203 | B1 * | 1/2006 | Wako | 701/533 |
| 7,225,077 | B2 * | 5/2007 | Kouchiyama | 701/426 |

(Continued)

FOREIGN PATENT DOCUMENTS

| JP | 09133543 A | * 5/1997 | ............ G01C 21/00 |
|---|---|---|---|
| JP | 10-160491 | 6/1998 | |

(Continued)

OTHER PUBLICATIONS

International Search Report for PCT/JP2008/058054.
International Preliminary Report on Patentability (Application No. PCT/JP2008/058054) dated Dec. 3, 2009.

(Continued)

*Primary Examiner* — Thomas Black
*Assistant Examiner* — Peter D Nolan
(74) *Attorney, Agent, or Firm* — Eric J. Robinson; Robinson Intellectual Property Law Office, P.C.

(57) ABSTRACT

Provided is a navigation device which can automatically display on a map screen, an icon of a facility, information of which is not held in the navigation device. According to the navigation device (2), when it is judged that content information received from a roadside radio device (1) contains "object facility coordinate information" and "icon image information", these information are written into a facility information table (252). When displaying a map screen and an existing facility icon on a display unit (22), it is judged whether the facility information table (252) contains facility icon information having coordinate information contained within a range indicated by the map screen. If YES, the corresponding facility icon is overlay-displayed on the map screen and the existing facility icon.

12 Claims, 5 Drawing Sheets

(56) References Cited

U.S. PATENT DOCUMENTS

| | | | |
|---|---|---|---|
| 7,239,963 B2* | 7/2007 | Suzuki | 701/438 |
| 7,379,812 B2* | 5/2008 | Yoshioka et al. | 701/426 |
| 7,428,460 B2* | 9/2008 | Atarashi et al. | 701/532 |
| 7,457,704 B2* | 11/2008 | Yasuda et al. | 701/455 |
| 7,499,800 B2* | 3/2009 | Kimura | 701/438 |
| 7,647,166 B1* | 1/2010 | Kerns | 701/412 |
| 7,650,237 B2* | 1/2010 | Aoto | 701/437 |
| 7,769,541 B2* | 8/2010 | Watanabe | 701/450 |
| 8,285,481 B2* | 10/2012 | De Silva et al. | 701/409 |
| 2002/0072848 A1* | 6/2002 | Hamada et al. | 701/211 |
| 2003/0092429 A1* | 5/2003 | Chen et al. | 455/414 |
| 2005/0165543 A1* | 7/2005 | Yokota | 701/204 |

FOREIGN PATENT DOCUMENTS

| | | |
|---|---|---|
| JP | 2003-156352 | 5/2003 |
| JP | 2003-207353 | 7/2003 |
| JP | 2004-021548 | 1/2004 |
| JP | 2007-128344 | 5/2007 |
| JP | 2008-033061 | 2/2008 |

OTHER PUBLICATIONS

Written Notification of Reason for Refusal (Application No. 2007-119236) dated Nov. 22, 2011.

Written Notification of Reason for Refusal (Application No. 2007-119236) dated Jul. 27, 2012.

* cited by examiner

FIG. 3

| | |
|---|---|
| ENTERPRISER INFORMATION | ENTERPRISER CODE |
| | TEXT FOR DISPLAY OF ENTERPRISER NAME |
| | ⋮ |
| INFORMATION PROVIDER INFORMATION | COMPANY CODE OF INFORMATION PROVIDING COMPANY |
| | TEXT FOR DISPLAY OF INFORMATION PROVIDING COMPANY NAME |
| | INFORMATION CODE |
| | TEXT FOR DISPLAY OF INFORMATION TITLE |
| | VALID TERM |
| | ⋮ |
| OBJECT FACILITY INFORMATION | OBJECT FACILITY COORDINATE INFORMATION |
| | BUSINESS HOURS INFORMATION |
| | ICON IMAGE INFORMATION |
| | INFORMATION PROVISION START POSITION INFORMATION |
| | ⋮ |
| CONTENT ACTUAL DATA UNIT | TEXT FOR DISPLAY INFORMATION |
| | STATIC IMAGE FOR DISPLAY INFORMATION |
| | AUDIO FILE INFORMATION |
| | ⋮ |
| ⋮ | ⋮ |

NAVIGATION DEVICE AND DISPLAY METHOD

TECHNICAL FIELD

The present invention relates to a navigation device and a display method.

BACKGROUND ART

Conventionally, in a car-mounted navigation device, map information is stored beforehand and, based on current position information detected by GPS (Global Positioning System) or the like, corresponding map information is read to display a map screen for displaying a current position of a vehicle and performing route guide to a destination. Also, a navigation device is known that displays a mark indicating a current position of a vehicle as well as an icon image such as a pictogram indicating various facilities such as stores, restaurants and hospitals in the vicinity of the current position.

For example, in the Japanese Patent Application Laid-Open No. H5-113754, an art is described that stores facility information (such as a service type and location information) about a particular facility within map information in facility information storage means and, when displaying the map information, displays landmark image information of a particular facility contained in the map information at a position of that facility.

DISCLOSURE OF THE INVENTION

Problems to be Solved by the Invention

However, in a conventional navigation device such as the one described in the Japanese Patent Application Laid-Open No. H5-113754, a facility in the vicinity of a current position of a vehicle is displayed with an icon or the like based on information of a facility, such as map coordinate information and image information of a facility, stored in a storage medium held by the navigation device, such as a CD-ROM (Compact Disc Read Only Memory), an HD (Hard Disk) and a DVD. Therefore, there is a problem, for example, that a facility whose information is not held in the navigation device, such as a newly opened store, cannot be displayed on a map screen.

A technical problem of the present invention is to provide a navigation device which can automatically display on a map screen an icon of a facility, information of which is not held in the navigation device.

Means for Solving the Problems

In order to solve the above described problem, a navigation device of the present invention is the one that functions so as to display on a display unit a map screen and an existing facility icon based on map information and existing facility icon information stored beforehand in a first storage unit, the navigation device basically comprising: a reception unit which receives communication information transmitted from an external information providing device; information processing means for judging whether the received communication information contains facility icon information and, if yes, storing the facility icon information in a second storage unit; and display control means for judging, when displaying a map screen and an existing facility icon on the display unit, whether facility icon information which should be displayed on the map screen is stored in the second storage unit and, if yes, overlay-displaying on the map screen and the existing facility icon a facility icon based on the facility icon information stored in the second storage unit.

Preferably, the facility icon information is given a valid term and the navigation device of the present invention comprises delete means for deleting from the second storage unit the facility icon information whose valid term has expired.

Further preferably, the navigation device of the present invention adopts any or all of the configurations below:

(i) The facility icon information contains audio information, and the navigation device comprises an audio output unit which outputs audio based on audio information corresponding to a facility icon displayed on the map screen.

(ii) The facility icon information contains business hours information of a facility, and the display control means judges, of facility icon information stored in the second storage unit, facility icon information whose business hours include a current time as facility icon information which should be displayed on the map screen.

(iii) The facility icon information contains guide hours information, and the display control means judges, of facility icon information stored in the second storage unit, facility icon information whose guide hours include a current time as facility icon information which should be displayed on the map screen.

(iv) The navigation device comprises setting means for setting requirements of facility icon information which should be displayed on the map screen, and the display control means judges, of facility icon information stored in the second storing unit, facility icon information satisfying requirements set by the setting means as facility icon information which should be displayed on the map screen.

Also, the present invention can be recognized, in a different aspect, as a display method in a navigation device which displays a map screen and an existing facility icon on a display unit based on map information and existing facility icon information stored beforehand in a first storage unit, the display method comprising the steps of:

receiving communication information transmitted from an external information providing device;

judging whether the received communication information contains facility icon information and, if yes, storing the facility icon information in a second storage unit; and judging, when displaying a map screen and an existing facility icon on the display unit, whether facility icon information which should be displayed on the map screen is stored in the second storage unit and, if yes, overlay-displaying on the map screen and the existing facility icon a facility icon based on the facility icon information stored in the second storage unit.

Effects of the Invention

According to the present invention, it is possible to automatically display on a maps screen an icon of a facility, information of which is not held in a navigation device.

BRIEF DESCRIPTION OF THE DRAWINGS

FIG. 3 is a diagram showing one example of a data format of content information delivered from a server in FIG. 1;

DESCRIPTION OF SYMBOLS

Figure 1:
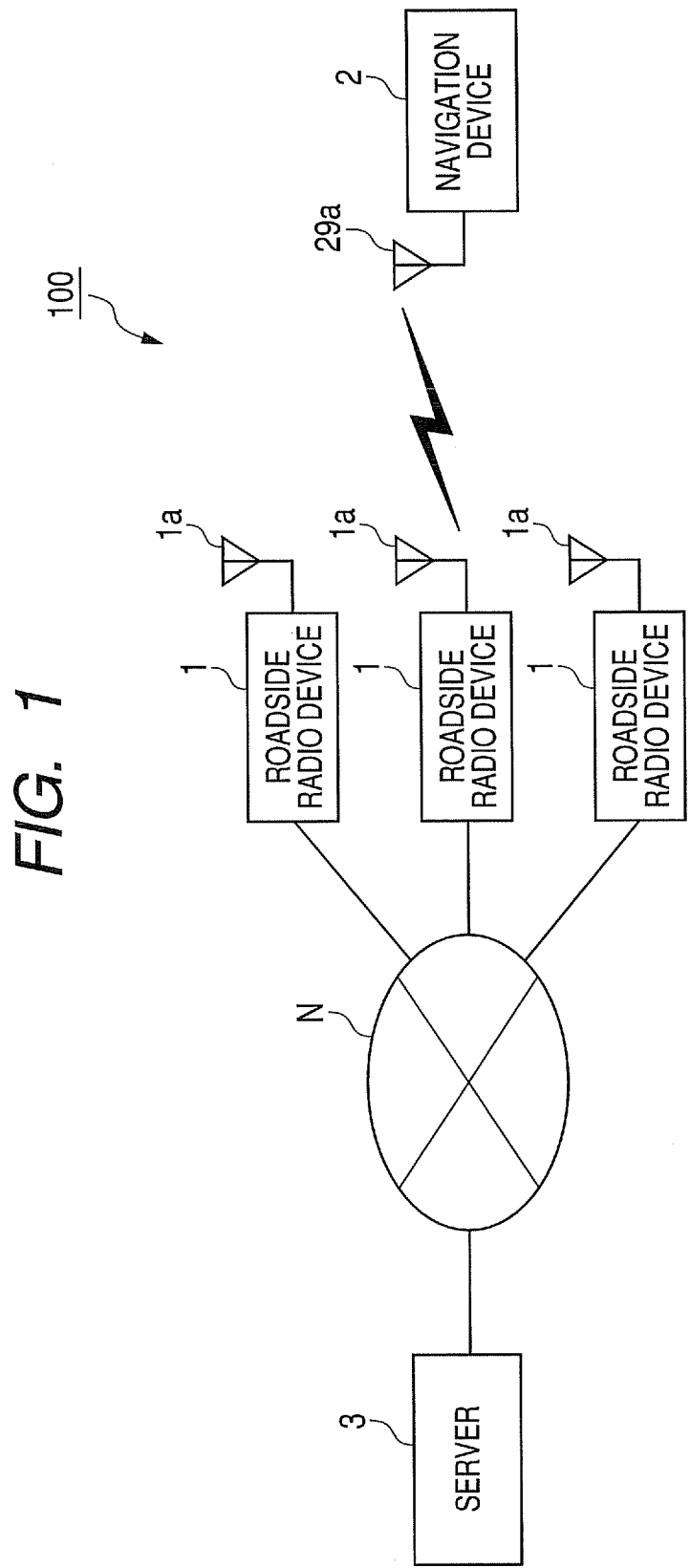
FIG. 1 is a diagram showing an outline of a DSRC system and a navigation device of an embodiment in accordance with the present invention.

100 DSRC system
1 roadside radio device
2 navigation device
3 server
20 control unit
21 operation input unit
22 display unit
23 audio output unit
24 hard disk device
241 map DB
242 guide figure DB
243 guide voice DB
244 facility information DB
25 reception information storage unit
251 content information storage unit
252 facility information table
26 GPS module
27 self-contained navigation unit
28 VICS module
29 DSRC transceiver unit

BEST MODES FOR CARRYING OUT THE INVENTION

Embodiments in accordance with the present invention will now be described in detail with reference to accompanying drawings. However, the scope of the invention is not limited to shown examples.

FIG. 1 shows an outline of a DSRC (Dedicated Short Range Communication) system 100 and a navigation device 2.

A DSRC system referred herein is a system introduced as a part of ITS (Intelligent Transport System), and is a communication system that enables transmitting and receiving information between an information providing apparatus (server) and a vehicle-mounted apparatus having DSRC functionality (such as a navigation device) within a limited communication area of about several to several tens of meters.

As shown in FIG. 1, the DSRC system 100 includes a roadside radio device 1 having a DSRC antenna 1a and a server 3 connected to the roadside radio device 1 via a communication network N.

The roadside radio device 1 is provided at a side of or above a road, a roadside station, a parking lot, etc. and emits radio waves of DSRC whose outreach is extremely limited to perform bidirectional dedicated short range radio communication to and from a navigation device 2 having DSRC functionality which is mounted on a vehicle stopped in or running through a predetermined communication area. The roadside radio device 1 is connected to the server 3 through the communication network N such as an IP network dedicated for DSRC so as to be able to transmit and receive data. When communication with the navigation device 2 is established, the roadside radio device 1 notifies the server 3 that a connection is made and receives content information from the server 3 to transmit to the navigation device 2.

The server 3 is a server administered by a service provider, and it is an apparatus which accumulates in a high-capacity storage device content information, such as advertisements that an information provider (such as a company operating various facilities) asked to deliver, and performs as needed delivery to the navigation device 2 communicatably connected to the roadside radio device 1. Based on an area in which the roadside radio device 1 having established communication with the navigation device 2 exists, the server 3 can delivers content information appropriate for the area.

The navigation device 2 is a device having DSRC functionality for performing communication with the roadside radio device 1 based on DSRC and navigation functionality for displaying a current position of a vehicle and route guide to a destination.

Figure 2:
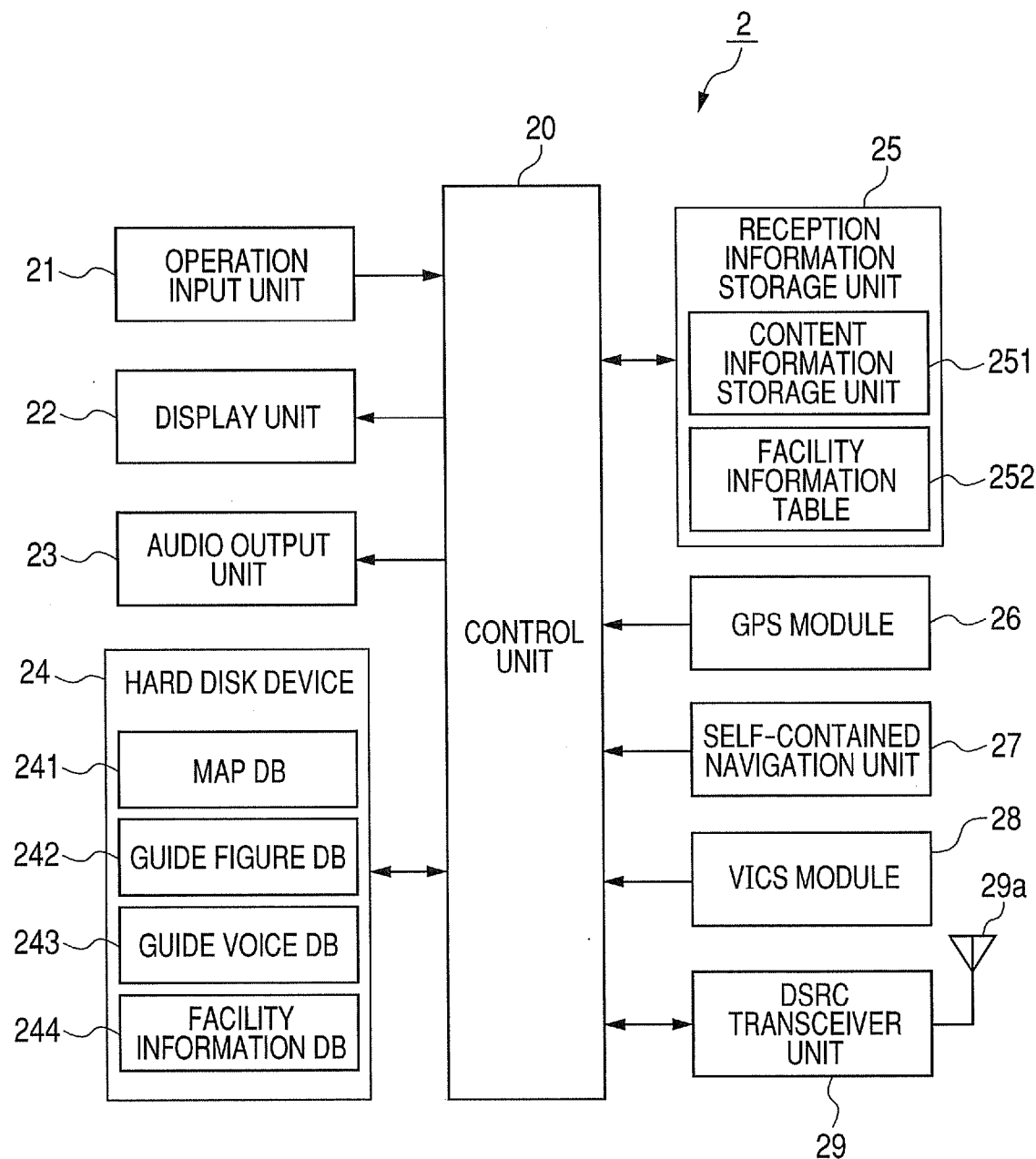
FIG. 2 is a block diagram showing a functional configuration of the navigation device in FIG. 1.

FIG. 2 shows a functional configuration example of the navigation device 2.

As shown in FIG. 2, the navigation device 2 is configured comprising a control unit 20, an operation input unit 21, a display unit 22, an audio output unit 23, a hard disk device 24, a reception information storage unit 25, a GPS (Global Positioning System) module 26, a self-contained navigation unit 27, a VICS (Vehicle Information and Communication System) module 28, a DSRC transceiver unit 29, etc.

The control unit 20 is configured with a CPU (Central Processing Unit), a ROM (Read Only Memory), a RAM (Random Access Memory), etc. The CPU of the control unit 20 reads and executes a system program stored in the ROM and drives and controls each unit of the navigation device 2. Also, the CPU reads various processing programs stored in the ROM to deploy in the RAM based on information input via the operation input unit 21, the GPS module 26, the VICS module 28, the DSRC transceiver unit 29, etc. and performs various processes according to the deployed programs.

For example, when a destination is set via the operation input unit 21 and route search is ordered, the control unit 20 performs a route search process and reads from map information stored in the hard disk device 24 road information containing node (node point such as an intersection, a branch point and a bending point) information and link (straight line route) information, and based on the read road information, the control unit 20 searches routes (such as a standard route, a shortest distance route, a minimum fee route, a minimum time route, etc) from a current position of an own vehicle (own vehicle position) to the destination in accordance with various requirements. When the route search process is finished, the control unit 20 displays on the display unit 22 a selection screen for a user to select a guided route used for route guide from the searched routes, sets one route of the searched routes as a guided route used for route guide in accordance with select input from the operation input unit 21, and stores the guided route as a route search result in the RAM.

Also, when route guide is ordered via the operation input unit 21, the control unit 20 performs a route guide process, and based on an own vehicle position output from the GPS module 26 or the like and a search result of the route search process, the control unit 20 reads from the hard disk device 24 data needed for route guide (such as map information about the vicinity of the own vehicle position, facility information, guide figure data, etc.) to store in a RAM and displays route guide on the display unit 22 or outputs audio of route guide from the audio output unit 23.

Also, the control unit 20 performs a reception information process described below to achieve functionality as information processing means. That is, the control unit 20 performs the reception information process, judges whether communication information received by the DSRC transceiver unit 29 contains facility icon information, and if yes, stores the facility icon information in the reception information storage unit 25.

Also, the control unit 20 performs an icon display process described below to achieve functionality as display control means. That is, the control unit 20 performs the icon display process, displays a map screen and an existing facility icon on the display unit 22, further judges whether facility icon information is stored in a facility information table 252 of the reception information storage unit 25 and, if yes, overlay-displays on the map screen and the existing facility icon a facility icon based on the facility icon information stored in the facility information table 252.

Facility icon information referred herein denotes information, of information received by the DSRC transceiver unit 29, needed for displaying an icon (including an image such as a graphic, symbol, mark, letter, etc.) indicating various facilities on a map screen, and contains at least map coordinate information (latitude and longitude) of an object facility and icon image information (including information for specifying icon image information such as a file name of icon image information). Also, a facility icon denotes an icon displayed based on facility icon information received by the DSRC transceiver unit 29.

On the other hand, information stored in a facility information DB 244 of the hard disk device 24, that is, held beforehand in the navigation device 2, and needed for displaying an icon indicating various facilities on a map screen is called existing facility icon information, and an icon displayed on a map screen based on the existing facility icon information is called an existing facility icon.

Also, when an existing facility icon or a facility icon displayed on a map screen of the display unit 22 is specified by operation of the operation input unit 21 and ordered to be set as a destination, the control unit 20 sets a point of coordinate information corresponding to the specified icon as a destination.

Furthermore, the control unit 20 stores various setting information about navigation display, such as whether icon display setting on a map screen exists, based on input from the operation input unit 21.

The operation input unit 21 comprises arrow keys for indicating directions (up, up right, right, down right, down, down left, left, and up left), a set key disposed at a central portion of the arrow keys, numeric keys, and other various keys associated with various functions such as using navigation, and outputs to the control unit 20 an operation signal corresponding to a key which is operated. Also, the operation input unit 21 comprises a touch panel provided so as to cover a screen of the display unit 22, detects coordinates that are touched and instructed by coordinate reading principles such as an electromagnetic induction method, a magnetostrictive method and a pressure sensitive method, and outputs the detected coordinates to the control unit 20 as a position signal. Alternatively, the operation input unit 21 may have a configuration comprising a remote control, a microphone, etc.

The display unit 22 is configured with a color liquid crystal display and others, and displays on a display screen display information for navigation such as a map screen, an icon and a guide figure in accordance with instruction from the control unit 20.

The audio output unit 23 is configured comprising a D/A converter, an amplifier, a speaker, etc. and converts audio data to analog signals to perform audio output according to instruction from the control unit 20.

The hard disk device 24 is a first storage unit which includes a map DB (Data Base) 241, a guide figure DB 242, a guide voice DB 243, a facility information DB 244, etc. and stores data needed for route search and route guide in the navigation device 2. The first storage unit is not limited to a hard disk device, and a recording medium such as a CD-ROM and a DVD and a drive or the like which reads information from these recording media may be used.

The map DB 241 is a database which stores map information including road information, railroad information and river information. The road information includes information such as a node, a link, a name of each road, a type indicating classification of a road (such as an express way, a national road, a prefectural road, a general road, a main road and a toll road), the width of a road, a name and map coordinate information (latitude and longitude) of an IC (interchange), a name and map coordinate information of a SA (Service Area), etc.

The river information includes information such as a name of each river, a node (map coordinate information of a contact point such as a branch point to a tributary and a bending point), a link (a straight-line portion of a river), etc.

The railroad information includes a name of each railroad, a type, a node (map coordinate information of a contact point such as a station and a bending point of a railroad), a link (a straight-line portion of a railroad), information of a station on each railroad (a name of a station, a type (such as a terminal station)), etc.

The guide figure DB 242 is a database which stores guide figure data (for example, image data such as an intersection enlarged figure, a direction signboard, a traveling direction arrow, etc.) for displaying a guide image at a point of route guide.

The guide voice DB 243 is a database which stores voice data of a message needed for route guide.

The facility information DB 244 is a database which stores type information of various facilities, an individual name of a facility, and facility icon information (that is, existing facility icon information including map coordinate information of a facility and icon image information).

The reception information storage unit 25 is a second storage unit which is configured with a semiconductor memory and others and stores communication information from the roadside radio device 1 received by the DSRC transceiver unit 29. For example, the reception information storage unit 25 comprises a content information storage unit 251 which stores data of content information delivered from the roadside radio device 1 and a facility information table 252 which stores facility icon information and others for displaying on a map screen of the display unit 22 a facility icon of a point (facility) which is an object of the delivered content.

FIG. 3 shows one example of data format of content information received from the roadside radio device 1 in the present embodiment. As shown in FIG. 3, content information contains content actual data for displaying or audio-outputting content as well as information about content such as enterpriser information, information provider information and object facility information.

The enterpriser information is enterpriser information about a service provider which delivers content and contains, for example, an enterpriser code of a service provider which provides content, text for display of enterpriser name, etc.

The information provider information is information about an information provider which provides information to be delivered (that is, content) and contains, for example, a company code of an information providing company, text for display of an information providing company name, an information code indicating a type of information to be delivered, text for display of an information title, a valid term of information, etc.

The object facility information is information about a facility which is an object of information to be delivered, and contains coordinate information (latitude and longitude) of an object facility of information to be delivered, business hours information indicating business hours of an object facility, icon image information which is image information for displaying a facility icon indicating an object facility, information provision start position information indicating a position (coordinate information) at which provision of content is started, etc.

The facility information table 252 stores facility icon information contained in content information, that is, stores object facility coordinate information and icon image information so as to be associated with each other. The facility information table 252 may further store information such as text for display of an information providing company name and a valid term included in content information so as to be associated with each other.

The GPS module 26 is configured comprising a GPS antenna which is not shown and others. This GPS antenna receives GPS signals transmitted from a plurality of GPS satellites launched into low Earth orbit. The GPS antenna receives GPS signals transmitted from at least three GPS satellites and detects an absolute current position (latitude and longitude) of a vehicle based on the received GPS signals to output to the control unit 20.

The self-contained navigation unit 27 is configured comprising an angle sensor, a distance sensor, etc. The angle sensor detects angular speed (a rotation angle in horizontal directions per unit time) of a vehicle to calculate an amount of change of moving direction. The distance sensor detects a pulse signal output in accordance with rotation of a wheel to calculate an amount of movement of a vehicle. With these angular speed signal and vehicle speed pulse signal, the self-contained navigation unit 27 calculates relative positional change of a vehicle to output to the control unit 20.

The VICS module 28 receives traffic jam information by receiving a broadcast from an FM multiple broadcasting station or the like via an antenna, which is not shown, to output to the control unit 20. Or, the VICS module 28 may have a configuration which receives traffic jam information broadcasted from a beacon transmitter using optical/radio waves from an apparatus provided on a road.

The DSRC transceiver unit 29 is a reception unit which comprises a DSRC antenna 29*a*, performs bidirectional dedicated short range radio communication with the roadside radio device 1 based on DSRC, and receives various communication information such as content information delivered from the roadside radio device 1 to output to the control unit 20.

For example, when coming into a communication area of the roadside radio device 1, the DSRC transceiver unit 29 receives a DSRC radio wave emitted from the roadside radio device 1 to perform a communication connection process with the roadside radio device 1 based on DSRC. When communication with the roadside radio device 1 is established and communication information such as content information is received from the roadside radio device 1, the received communication information is output to the control unit 20.

By having a configuration in which the DSRC transceiver unit 29 includes a memory at the interior thereof, storing in the memory information such as screen resolution of the display unit 22, a geographical coordinate system of map information, and information storage capacity of the reception information storage unit 25 in the navigation device 2, and allowing the DSRC transceiver unit 29 to inform the roadside radio device 1 of these information when starting communication with the roadside radio device 1, it is possible to receive data in accordance with the navigation device 2 from the roadside radio device 1.

The operation of the present embodiment will now be described.

Figure 4:
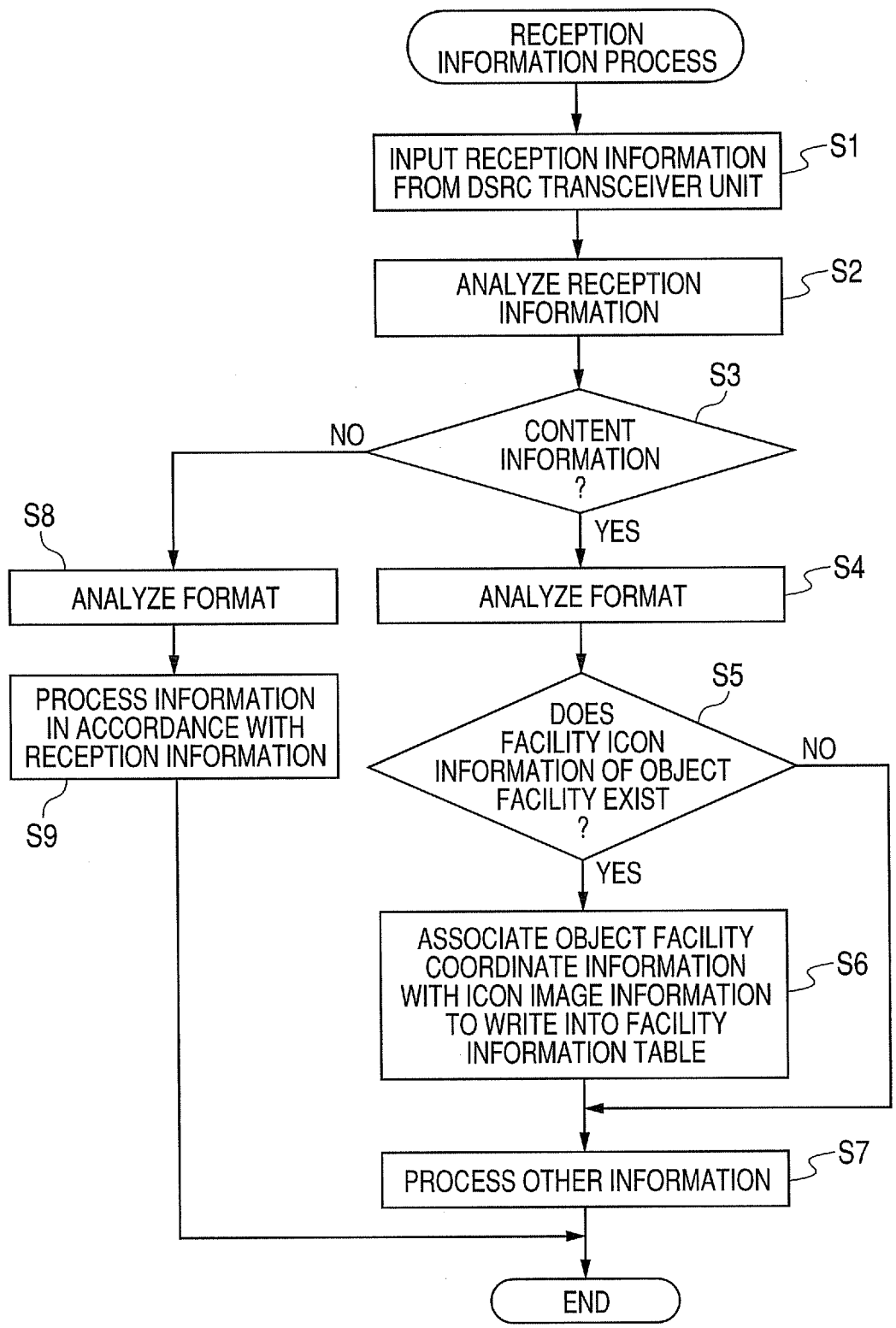
FIG. 4 is a flow chart showing a reception information process performed by a control unit in FIG. 2.
Figure 5:
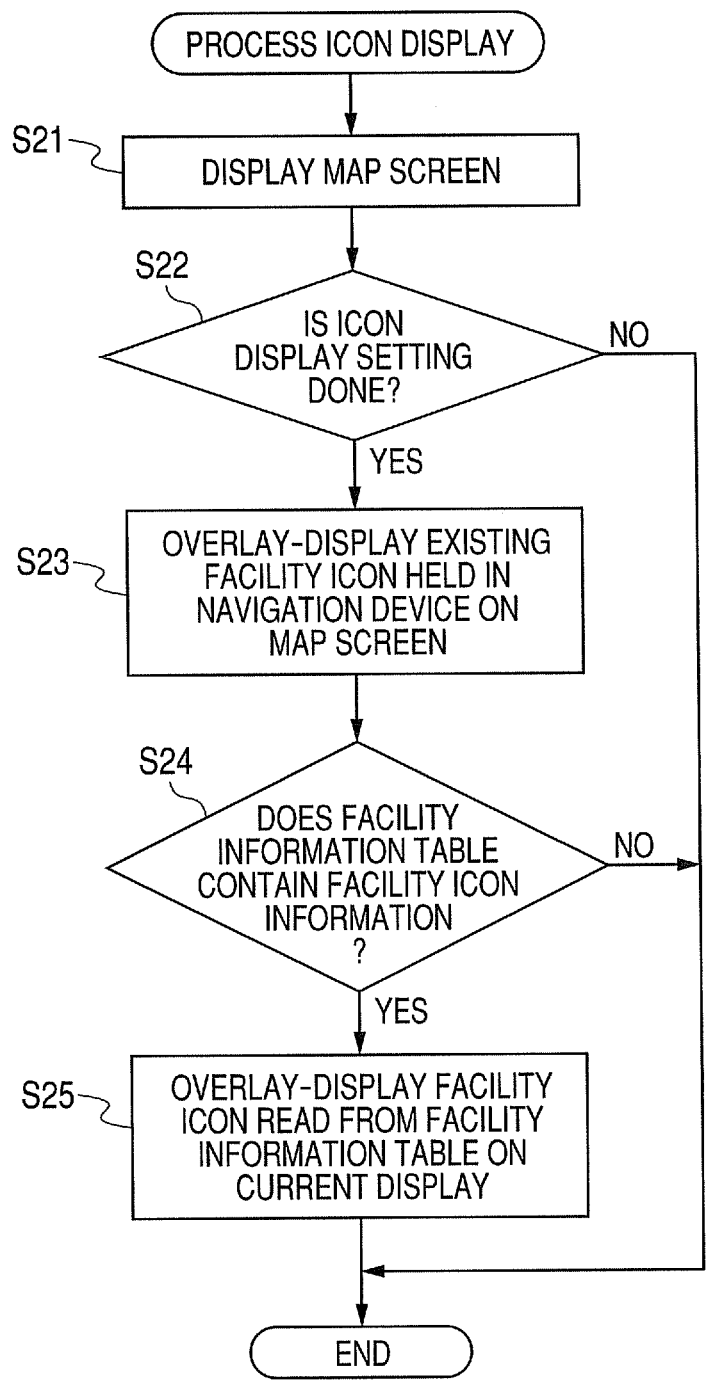
FIG. 5 is a flow chart showing an icon display process performed by the control unit in FIG. 2.

FIG. 4 shows a reception information process performed by the control unit 20. FIG. 5 shows an icon display process performed by the control unit 20.

First, a reception information process performed by the control unit 20 will be described with reference to FIG. 4.

When communication information (reception information) received from the roadside radio device 1 is input from the DSRC transceiver unit 29 (step S1), analysis of reception information is performed (step S2). For example, reception information is given information indicating a type of reception information, with which a type of reception information is analyzed.

If it is judged that the reception information is content information (YES in step S3), format analysis of the content information is performed (step S4) and it is judged whether the received content information contains facility icon information, that is, "object facility coordinate information" and "icon image information" (step S5). If it is judged that the received content information does not contain facility icon information, the process goes to step S7 and other information processes such as storing the received content information in the content information storage unit 251, displaying content, outputting audio, etc. is performed (step S7), and the present process is finished.

If it is judged that the received content information contains facility icon information (YES in step S5), "object facility coordinate information" and "icon image information" included in the content information are associated with each other and written into the facility information table 252 (step S6). Then, other information processes, such as storing the received content information in the content information storage unit 251, displaying content, outputting audio, etc. is performed (step S7) and the present process is finished.

On the other hand, as a result of analyzing the reception information, if it is judged that the reception information is not content information (NO in step S3), format analysis of the reception information is performed (step S8) and an information process in accordance with the received information is performed (step S9), and the present process is finished.

With the above described reception information process, facility icon information of an object facility included in content information received from the roadside radio device 1, that is, object facility coordinate information and icon image information, is stored in the facility information table 252.

Next, an icon display process performed by the control unit 20 will be described with reference to FIG. 5. The process is a process performed each time an own vehicle position moves for a predetermined distance (or in accordance with instruction from the operation input unit 21).

First, map information within a range in accordance with an own vehicle position detected by the GPS module 26 (or a range specified by the operation input unit 21) is read from the map DB 241. Based on the read map information, a map screen is displayed on a display screen of the display unit 22 (step S21).

Next, it is judged whether icon display setting on a map screen is done, and if it is judged that icon display setting is not done (NO in step S22), the present process is finished.

On the other hand, if it is judged that icon display setting on a map screen is done (YES in step S22), an existing facility icon held beforehand in the navigation device 2 is overlay-displayed on a map screen (step S23). That is, existing facility icon information having coordinate information contained within a range indicated by the displayed map screen is searched and processed in the facility information DB 244, and based on the searched existing icon information, an existing facility icon is overlay-displayed on the map screen.

Next, in the facility information table 252, it is judged whether facility icon information which should be displayed on the displayed map screen is stored in the facility information table 252. In the present embodiment, facility icon information having "object facility coordinate information" contained within a range indicated by the displayed map screen is searched and processed, and it is judged whether facility icon information having "object facility coordinate information" contained within a range indicated by the displayed map screen is stored in the facility information table 252.

As a result of the judgment, if it is judged that facility icon information which should be displayed on the displayed map screen is not stored in the facility information table 252 (NO in step S24), the present process is finished.

On the other hand, if it is judged that facility icon information which should be displayed on the displayed map screen is stored in the facility information table 252 (YES in step S24), the corresponding facility icon information is read from the facility information table 252, and based on the read facility icon information, a new facility icon is superimposed or overlay-displayed on, the currently displayed map screen and existing facility icon (step S25) and the present process is finished.

As described above, according to the navigation device 2, if it is judged that content information received from the roadside radio device 1 contains "object facility coordinate information" and "icon image information", these information are written into the facility information table 252. Then, when displaying a map screen and an existing facility icon on the display unit 22, it is judged whether facility icon information having coordinate information contained within a range indicated by the map screen is stored in the facility information table 252, and if yes, a corresponding facility icon is overlay-displayed on the map screen and the existing facility icon.

Thus, a facility icon which is not stored in the hard disk device 24 of the navigation device 2, or not held in the navigation device 2, can be received from the roadside radio device 1 and the received facility icon can be displayed on a map screen.

Also, since a facility icon is overlay-displayed on a map screen displayed on the display unit 22 and an existing facility icon held in the navigation device 2, if facility icon information for a newly opened facility is received, for example, it is possible to display a newly delivered facility icon over an existing facility icon even if the navigation device 2 holds existing facility icon information of a facility which existed before at the position of the newly opened facility.

The description in the above described embodiment is one example of a navigation device in accordance with the present invention, and the present invention is not limited thereto.

For example, even though in the above described embodiment content information delivered from the roadside radio device 1 contains "object facility coordinate information" and "icon image information" as facility icon information, the present invention is not limited to this, and facility icon information may be contained in other information or only facility icon information may be delivered.

Also, although in the above described embodiment it is described that facility icon information is received through communication based on DSRC, the present invention is not limited to this, and a configuration may be used, for example, in which facility icon information is received through a wireless LAN, packet communication, etc.

Also, although it is described that both an existing facility icon held in the navigation device 2 and a facility icon based on the received facility icon information are displayed if icon display setting on a map screen is done, a configuration may be used in which it is possible to set with predetermined operation of the operation input unit 21 so that only a received facility icon is displayed on a map.

Also, if received content information contains data of "object facility coordinate information" but not includes data of "icon image information", "object facility coordinate information" may be associated with information indicating "no icon image information" to store in the facility information table 252 along with facility icon information. Then, when displaying a facility icon, an icon image of a mark (such as a mark of a pin) held in the navigation device 2 may be displayed as well at a position on a map screen corresponding to the stored coordinate information.

Also, information of a valid term may be stored in the facility information table 252 along with icon image information and coordinate information of a facility, and the control unit 20 may perform a process as delete means which compares valid term information stored in the facility information table 252 and a current time for each predetermined interval of time and deletes facility icon information whose valid term has expired from the facility information table 252. This enables to prevent an event in which continuously delivered information makes the reception information storage unit 25 of the navigation device 2 run out of storage capacity and new information can no longer be received.

Also, in the above described embodiment, although facility icon information is described as map coordinate information and icon image information of a facility, facility icon information delivered from the roadside radio device 1 is not limited to these information and may contain, for example, an audio file such as a theme song of that facility. Then, facility icon information containing an audio file may be stored in the facility information table 252 and the control unit 20 may control so that a theme song or the like of a facility is audio-output by the audio output unit 23 when an own vehicle position proceeds into an area within a predetermined range centered around the coordinates of that facility.

Also, although in the above described embodiment, of information contained in content information, map coordinate information and icon image information of a facility are written into the facility information table 252 as facility icon information, other information contained in content information, such as business hours information, may be contained in facility icon information. Then, that information may be used as a requirement when displaying a facility icon. That is, in step S6 of the above described reception information process, if received content information contains business hours information, the control unit 20 writes into the facility information table 252 facility coordinate information and icon image information as well as business hours information associated therewith. Then, when judging whether facility icon information which should be displayed is stored in the facility information table 252 in the process of step S24 of the icon display process, the control unit 20 may also refer to "business hours information" in the facility information table 252 and judge only facility icon information whose business hours include a current time as facility icon information which should be displayed.

Also, content information delivered from the roadside radio device 1 may contain guide hours information. Guide hours are a time period within business hours of a facility, and they are a time period specifically specified by an information provider for which a guide is displayed. For example, a facility which provides different services in different time periods can include in content information a time period of a service for which an information provider particularly expects a lot of visitors (such as a lunch service of a restaurant) as guide hours. Also, a time period in which there are particularly a small number of visitors may be contained in content information. Then, if content information containing this guide hours information is received, the guide hours information may be included in facility icon information to store in the facility information table 252 in the above described reception information process, and only facility icon information whose guide hours include a current time may be judged as facility icon information which should be displayed in the process of step S24 of the icon display process.

Also the operation input unit 21 may be provided with setting means with which a user sets and inputs requirements of facility icon information which should be displayed on a map screen. Then, in the process of step S24 of the icon display process, only facility icon information which satisfies requirements set by a user may be judged as facility icon information which should be displayed. For example, in case content information delivered from the roadside radio device 1 contains facility genre information indicating a genre of an object facility, if facility genre information which a user intends to be displayed is set beforehand via the operation input unit 21, it is possible to display only a facility icon of a genre which a user desires on a map screen.

Also, the operation input unit 21 may be provided with setting means for setting and inputting display/nondisplay of a facility icon on a map screen. Then, in processing of step S24 of the icon display process, if nondisplay of a facility icon is set by a user, it may be judged that there is no facility icon which should be displayed.

Also, a detailed configuration and a detailed operation of the navigation device 2 in the above described embodiment may also be altered as needed without departing from the spirit of the present invention.

The invention claimed is:

1. A navigation device which displays a map screen and an existing facility icon on a display unit based on map information and existing facility icon information stored beforehand in a first storage unit, the navigation device comprising:
   a reception unit which receives communication information transmitted from an external information providing device;
   an information processing unit adapted to judge whether the received communication information contains facility icon information that is not stored in the first storage unit and, if yes, storing the facility icon information including location information corresponding to said map information in a second storage unit; and
   a display control unit adapted to judge, when displaying a map screen and an existing facility icon on the display unit, whether facility icon information which should be displayed on the map screen is stored in the second storage unit and, if yes, overlay-displaying on the map screen and the existing facility icon a facility icon based on the facility icon information stored in the second storage unit,
   wherein the facility icon information is given a valid term, and
   wherein the navigation device comprises a delete unit adapted to delete from the second storage unit facility icon information whose valid term has expired.

2. The navigation device according to claim 1, wherein:
   the facility icon information contains audio information; and
   the navigation device comprises an audio output unit which outputs audio based on audio information corresponding to a facility icon displayed on the map screen.

3. The navigation device according to claim 2, wherein:
   the facility icon information contains business hours information of a facility; and
   the display control unit judges, of facility icon information stored in the second storage unit, facility icon information whose business hours include a current time as facility icon information which should be displayed on the map screen.

4. The navigation device according to claim 2, wherein:
   the facility icon information contains guide hours information; and
   the display control unit judges, of facility icon information stored in the second storage unit, facility icon information whose guide hours include a current time as facility icon information which should be displayed on the map screen.

5. The navigation device according to claim 2, wherein:
   the navigation device comprises a setting unit adapted to set requirements of facility icon information which should be displayed on the map screen; and
   the display control unit judges, of facility icon information stored in the second storage unit, facility icon information satisfying requirements set by the setting unit as facility icon information which should be displayed on the map screen.

6. The navigation device according to claim 1, wherein:
   the facility icon information contains business hours information of a facility; and
   the display control unit judges, of facility icon information stored in the second storage unit, facility icon information whose business hours include a current time as facility icon information which should be displayed on the map screen.

7. The navigation device according to claim 1, wherein:
   the facility icon information contains guide hours information; and
   the display control unit judges, of facility icon information stored in the second storage unit, facility icon information whose guide hours include a current time as facility icon information which should be displayed on the map screen.

8. The navigation device according to claim 1, wherein:
   the navigation device comprises a setting unit adapted to set requirements of facility icon information which should be displayed on the map screen; and
   the display control unit judges, of facility icon information stored in the second storage unit, facility icon information satisfying requirements set by the setting unit as facility icon information which should be displayed on the map screen.

9. The navigation device according to claim 1, wherein:
   the facility icon information contains business hours information of a facility; and
   the display control unit judges, of facility icon information stored in the second storage unit, facility icon information whose business hours include a current time as facility icon information which should be displayed on the map screen.

10. The navigation device according to claim 1, wherein:
the facility icon information contains guide hours information; and
the display control unit judges, of facility icon information stored in the second storage unit, facility icon information whose guide hours include a current time as facility icon information which should be displayed on the map screen.

11. The navigation device according to claim 1, wherein:
the navigation device comprises a setting unit adapted to set requirements of facility icon information which should be displayed on the map screen; and
the display control unit judges, of facility icon information stored in the second storage unit, facility icon information satisfying requirements set by the setting unit as facility icon information which should be displayed on the map screen.

12. A display method in a navigation device which displays a map screen and an existing facility icon on a display unit based on map information and existing facility icon information stored beforehand in a first storage unit, the display method comprising the steps of:

receiving communication information transmitted from an external information providing device;

judging whether the received communication information contains facility icon information and, if yes, storing the facility icon information that is not stored in the first storage unit in a second storage unit; and judging, when displaying a map screen and an existing facility icon on the display unit, whether facility icon information which should be displayed on the map screen is stored in the second storage unit and, if yes, overlay-displaying on the map screen and the existing facility icon a facility icon based on the facility icon information including location information corresponding to said map information stored in the second storage unit, wherein the facility icon information is given a valid term, and wherein the display method further comprises the step of deleting from the second storage unit facility icon information whose valid term has expired.

* * * * *